United States Patent
Holt et al.

(10) Patent No.: US 8,031,851 B2
(45) Date of Patent: *Oct. 4, 2011

(54) METHOD AND APPARATUS FOR ROUTING CALLS BASED ON THE IDENTIFICATION OF THE CALLING PARTY OR CALLING LINE

(75) Inventors: Scott Crandall Holt, Decatur, GA (US); Christopher Bertram Medders, Woodstock, GA (US); Drina C. Yue, Central (HK); Raymond J. Smets, Alpharetta, GA (US); Thomas Joseph Moquin, Alpharetta, GA (US); Terry Durand, Roswell, GA (US); Lawrence R. Berke, Alpharetta, GA (US); Evan Kraus, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/961,145

(22) Filed: Dec. 20, 2007
(Under 37 CFR 1.47)

(65) Prior Publication Data
US 2008/0095350 A1 Apr. 24, 2008

Related U.S. Application Data

(63) Continuation of application No. 11/611,346, filed on Dec. 15, 2006, which is a continuation of application No. 08/876,839, filed on Jun. 16, 1997, now Pat. No. 7,260,203, which is a continuation-in-part of application No. 08/469,491, filed on Jun. 6, 1995, now Pat. No. 5,764,747, which is a continuation of application No. 07/936,384, filed on Aug. 26, 1992, now abandoned.

(51) Int. Cl.
*H04M 3/42* (2006.01)
*H04M 3/54* (2006.01)

(52) U.S. Cl. .......... 379/201.02; 379/207.02; 379/211.03
(58) Field of Classification Search .......... 379/201.01–201.12, 207.01–207.16, 379/210.01, 211.02, 211.03, 212.01, 213.01, 379/214.01, 913, 917
See application file for complete search history.

(56) References Cited

U.S. PATENT DOCUMENTS 2,957,047 A 10/1960 Wennemer
(Continued)

FOREIGN PATENT DOCUMENTS

CA 2141480 3/1994
(Continued)

OTHER PUBLICATIONS

Holt; Non-Final Rejection mailed Jun. 30, 2008 for U.S. Appl. No. 11/611,346, filed Dec. 15, 2006.
(Continued)

*Primary Examiner* — Harry S Hong
(74) *Attorney, Agent, or Firm* — Thomas, Kayden, Horstemeyer & Risley, LLP

(57) ABSTRACT

A method and apparatus for routing calls for a subscriber based on the identification of the calling party or the originating line. Generally, the present invention operates to identify a calling party or originating line and then select a routing list based on this identification. Once a routing list has been selected, the call will be routed to the destination in the routing list. More specifically, when a call is received, an inquiry is made regarding the identity of the calling party or calling line. If the identification can be determined, then an attempt to retrieve a routing list associated with this identification is made. If a routing list has been provided for the identified party or line, the routing list will be retrieved. If a routing list has not been provided for the identified party or line, a default routing list will be selected for routing the call.

20 Claims, 7 Drawing Sheets

U.S. PATENT DOCUMENTS

| | | |
|---|---|---|
| 3,609,245 A | 9/1971 | Richter et al. |
| 4,277,649 A | 7/1981 | Sheinbein |
| 4,313,035 A | 1/1982 | Jordan et al. |
| 4,371,752 A | 2/1983 | Matthews et al. |
| 4,518,824 A | 5/1985 | Mondardini |
| 4,625,081 A | 11/1986 | Lotito et al. |
| 4,674,115 A | 6/1987 | Kaleita et al. |
| 4,680,785 A | 7/1987 | Akiyama et al. |
| 4,740,788 A | 4/1988 | Konneker |
| 4,752,951 A | 6/1988 | Konneker |
| 4,759,056 A | 7/1988 | Akiyama |
| 4,769,834 A | 9/1988 | Bilinger et al. |
| 4,790,003 A | 12/1988 | Kepley et al. |
| 4,791,665 A | 12/1988 | Bogart et al. |
| 4,853,952 A | 8/1989 | Jachmann et al. |
| 4,893,335 A | 1/1990 | Fuller |
| 4,899,358 A | 2/1990 | Blakley |
| 4,899,373 A | 2/1990 | Lee et al. |
| 4,926,470 A | 5/1990 | Sanford |
| 5,029,196 A | 7/1991 | Morganstein |
| 5,029,200 A | 7/1991 | Haas et al. |
| 5,040,208 A | 8/1991 | Jolissaint |
| 5,163,156 A | 11/1992 | Leung et al. |
| 5,181,236 A | 1/1993 | LaVallee et al. |
| 5,185,782 A | 2/1993 | Srinivasan |
| 5,195,131 A | 3/1993 | Sano |
| 5,197,096 A | 3/1993 | Sakuma et al. |
| 5,206,900 A | 4/1993 | Callele |
| 5,241,586 A | 8/1993 | Wilson et al. |
| 5,243,645 A | 9/1993 | Bissell et al. |
| 5,253,288 A | 10/1993 | Frey et al. |
| 5,276,731 A | 1/1994 | Arbel et al. |
| 5,282,243 A | 1/1994 | Dabbaghi et al. |
| 5,283,818 A | 2/1994 | Klausner et al. |
| 5,301,246 A | 4/1994 | Archibald et al. |
| 5,309,505 A | 5/1994 | Szlam et al. |
| 5,327,144 A | 7/1994 | Stilp et al. |
| 5,329,578 A | 7/1994 | Brennan et al. |
| 5,329,583 A | 7/1994 | Jurgensen et al. |
| 5,343,517 A | 8/1994 | Bogart et al. |
| 5,369,695 A | 11/1994 | Chakravarti et al. |
| 5,384,831 A | 1/1995 | Creswell et al. |
| 5,388,147 A | 2/1995 | Grimes |
| 5,392,342 A | 2/1995 | Rosenthal |
| 5,420,908 A | 5/1995 | Hodges et al. |
| 5,422,936 A | 6/1995 | Atwell |
| 5,430,791 A | 7/1995 | Feit et al. |
| 5,430,793 A | 7/1995 | Feit et al. |
| 5,434,909 A | 7/1995 | Price et al. |
| 5,438,568 A | 8/1995 | Weisser, Jr. |
| 5,440,620 A | 8/1995 | Slusky |
| 5,465,295 A | 11/1995 | Furman |
| 5,473,671 A | 12/1995 | Partridge, III |
| 5,475,746 A | 12/1995 | Miller et al. |
| 5,479,482 A | 12/1995 | Grimes |
| 5,487,111 A | 1/1996 | Slusky |
| 5,502,762 A | 3/1996 | Andrew et al. |
| 5,506,887 A | 4/1996 | Emery et al. |
| 5,515,043 A | 5/1996 | Berard et al. |
| 5,519,760 A | 5/1996 | Borkowski et al. |
| 5,544,229 A | 8/1996 | Creswell et al. |
| 5,546,442 A | 8/1996 | Foladare et al. |
| 5,548,636 A | 8/1996 | Bannister et al. |
| 5,553,125 A | 9/1996 | Martensson |
| 5,592,541 A | 1/1997 | Fleischet, III et al. |
| 5,598,457 A | 1/1997 | Foladare et al. |
| 5,600,704 A | 2/1997 | Ahlbert et al. |
| 5,608,782 A | 3/1997 | Carlsen et al. |
| 5,627,875 A | 5/1997 | Kapsales |
| 5,644,626 A | 7/1997 | Carlsen et al. |
| 5,649,003 A | 7/1997 | Kapsales et al. |
| 5,664,003 A | 9/1997 | Foladare et al. |
| 5,703,930 A | 12/1997 | Miska et al. |
| 5,706,329 A | 1/1998 | Foladare et al. |
| 5,706,339 A | 1/1998 | Eisdorfer et al. |
| 5,724,408 A | 3/1998 | Morganstein |
| 5,724,409 A | 3/1998 | Malik et al. |
| 5,724,411 A | 3/1998 | Eisdorfer et al. |
| 5,742,905 A | 4/1998 | Pepe et al. |
| 5,742,906 A | 4/1998 | Foladare et al. |
| 5,758,281 A | 5/1998 | Emery et al. |
| 5,764,747 A | 6/1998 | Yue et al. |
| 5,787,162 A | 7/1998 | Javitt |
| 5,802,160 A | 9/1998 | Kugell et al. |
| 5,815,808 A | 9/1998 | Valentine |
| 5,835,568 A | 11/1998 | Bass et al. |
| 5,862,209 A | 1/1999 | Kapsales |
| 5,875,240 A | 2/1999 | Silverman |
| 5,875,401 A | 2/1999 | Rochkind |
| 5,890,064 A | 3/1999 | Widergen et al. |
| 5,896,448 A | 4/1999 | Holt |
| 5,904,013 A | 5/1999 | Greenspan et al. |
| 5,905,789 A | 5/1999 | Will |
| 5,905,959 A | 5/1999 | Foladare et al. |
| 5,917,891 A | 6/1999 | Will |
| 5,926,756 A | 7/1999 | Piosenka et al. |
| 5,930,702 A | 7/1999 | Goldman et al. |
| 5,933,483 A | 8/1999 | Pellegrino et al. |
| 5,940,752 A | 8/1999 | Henrick |
| 5,949,775 A | 9/1999 | Rautiola et al. |
| 5,950,122 A | 9/1999 | Foladare et al. |
| 5,963,864 A | 10/1999 | O'Neil et al. |
| 5,966,433 A | 10/1999 | Courville et al. |
| 5,978,450 A | 11/1999 | McAllister et al. |
| 5,999,611 A | 12/1999 | Tatchell et al. |
| 6,005,870 A | 12/1999 | Leung et al. |
| 6,064,878 A | 5/2000 | Denker et al. |
| 6,070,054 A | 5/2000 | Foladare et al. |
| 6,078,805 A | 6/2000 | Scott |
| 6,104,799 A | 8/2000 | Jain et al. |
| 6,125,176 A | 9/2000 | Foladare et al. |
| 6,134,454 A | 10/2000 | Foladare et al. |
| 6,192,254 B1 | 2/2001 | Carlsen et al. |
| 6,259,782 B1 | 7/2001 | Gallant |
| 6,285,750 B1 | 9/2001 | Brachman et al. |
| 6,301,350 B1 | 10/2001 | Henningson et al. |
| 6,304,636 B1 | 10/2001 | Goldberg et al. |
| 6,314,124 B1 | 11/2001 | Infosino |
| 6,330,322 B1 | 12/2001 | Foladare et al. |
| 6,337,857 B1 | 1/2002 | Booton |
| 6,381,323 B1 | 4/2002 | Schwab et al. |
| 6,385,453 B1 | 5/2002 | Foladare et al. |
| 6,404,875 B2 | 6/2002 | Malik et al. |
| 6,421,437 B1 | 7/2002 | Slutsman |
| 6,501,834 B1 | 12/2002 | Milewski et al. |
| 6,501,838 B2 | 12/2002 | Brachman et al. |
| 6,516,060 B1 | 2/2003 | Foladare et al. |
| 6,567,671 B2 | 5/2003 | Amin |
| 6,603,973 B1 | 8/2003 | Foladare et al. |
| 6,694,003 B1 | 2/2004 | Karam |
| 6,718,026 B1 | 4/2004 | Pershan et al. |
| 6,748,066 B1 | 6/2004 | Espejo et al. |
| 6,757,704 B1 | 6/2004 | Denker et al. |
| 6,763,102 B1 | 7/2004 | Chen et al. |
| 6,785,560 B1 | 8/2004 | Chow et al. |
| 6,816,582 B2 | 11/2004 | Levine et al. |
| 6,856,806 B1 | 2/2005 | Bosik et al. |
| 6,950,507 B1 | 9/2005 | Kaplan |
| 6,954,455 B1 | 10/2005 | Al Hakim et al. |
| 6,978,004 B1 | 12/2005 | Levine |
| 7,177,631 B2 | 2/2007 | Amin |
| 7,194,080 B2 | 3/2007 | Worsham et al. |
| 7,260,203 B2 | 8/2007 | Holt et al. |
| 7,711,102 B2 | 5/2010 | Worsham et al. |
| 7,933,394 B2 | 4/2011 | Holt et al. |

FOREIGN PATENT DOCUMENTS

| | | |
|---|---|---|
| DE | 3315884 | 5/1983 |
| EP | 0420527 | 9/1990 |
| EP | 0451695 | 4/1991 |
| EP | 0726699 | 1/1996 |
| JP | 1-149650 | 6/1989 |
| WO | PCT/GB90/01328 | 8/1990 |
| WO | PCT/US90/06729 | 11/1990 |
| WO | PCT/US91/00483 | 1/1991 |
| WO | WO 9103137 | 3/1991 |
| WO | WO 9107838 | 5/1991 |

| WO | WO 9111874 | 8/1991 |
| WO | PCT/F192/00036 | 2/1992 |
| WO | WO 9214330 | 2/1992 |
| WO | 94/30023 | 6/1994 |

OTHER PUBLICATIONS

Worsham; Non-Final Rejection mailed Feb. 26, 2009 for U.S. Appl. No. 11/684,946, filed Mar. 12, 2007.
Holt; U.S. Appl. No. 11/611,346, filed Dec. 15, 2006.
Holt; Non-Final Rejection mailed Sep. 13, 2007; U.S. Appl. No. 11/611,346, filed Dec. 15, 2006.
Worsham; U.S. Appl. No. 09/896,922, filed Jun. 29, 2001.
Worsham; Non-Final Rejection mailed Oct. 3, 2003; U.S. Appl. No. 09/896,922, filed Jun. 29, 2001.
Worsham; Final Rejection mailed Jul. 19, 2004; U.S. Appl. No. 09/896,922, filed Jun. 29, 2001.
Worsham; Non-Final Rejection mailed Nov. 4, 2004; U.S. Appl. No. 09/896,922, filed Jun. 29, 2001.
Worsham; Final Rejection mailed Jun. 16, 2005; U.S. Appl. No. 09/896,922, filed Jun. 29, 2001.
Worsham; Non-Final Rejection mailed Oct. 31, 2005; U.S. Appl. No. 09/896,922, filed Jun. 29, 2001.
Worsham; Non-Final Rejection mailed Jul. 20, 2006; U.S. Appl. No. 09/896,922, filed Jun. 29, 2001.
Worsham; Notice of Allowance and Fees Due mailed Dec. 21, 2006; U.S. Appl. No. 09/896,922, filed Jun. 29, 2001.
Holt; U.S. Appl. No. 10/633,775, filed Aug. 4, 2003.
Holt; Non-Final Rejection mailed Mar. 18, 2005; U.S. Appl. No. 10/633,775, filed Aug. 4, 2003.
Holt; Notice of Allowance and Fee Dues mailed Aug. 2, 2005; U.S. Appl. No. 10/633,775, filed Aug. 4, 2003.
Holt; Notice of Allowance and Fee Dues mailed Jan. 24, 2006; U.S. Appl. No. 10/633,775, filed Aug. 4, 2003.
Yue; U.S. Appl. No. 08/881,620, filed Jun. 24, 1997.
Yue; Non-Final Rejection mailed Dec. 22, 1997; U.S. Appl. No. 08/881,620, filed Jun. 24, 1997.
Yue; Notice of Allowance and Fees Due mailed May 27, 1998; U.S. Appl. No. 08/881,620, filed Jun. 24, 1997.
Yue; U.S. Appl. No. 08/623,121, filed Mar. 28, 1996.
Yue; Non-Final Rejection mailed Jun. 7, 1996; U.S. Appl. No. 08/623,121, filed Mar. 28, 1996.
Yue; Final Rejection mailed Feb. 4, 1997; U.S. Appl. No. 08/623,121, filed Mar. 28, 1996.
Yue; Notice of Allowance and Fees Due mailed Mar. 27, 1997; U.S. Appl. No. 08/623,121, filed Mar. 28, 1996.
Yue; Examiner Interview Summary Record; U.S. Appl. No. 08/623,121, filed Mar. 28, 1996.
Yue; U.S. Appl. No. 08/469,491, filed Jun. 6, 1995.
Yue; Non-Final Rejection mailed Sep. 1, 1995; U.S. Appl. No. 08/469,491, filed Jun. 6, 1995.
Yue; Final Rejection mailed Feb. 14, 1996; U.S. Appl. No. 08/469,491, filed Jun. 6, 1995.
Yue; Advisory Action mailed Apr. 29, 1996; U.S. Appl. No. 08/469,491, filed Jun. 6, 1995.
Yue; Non-Final Rejection mailed Nov. 5, 1996; U.S. Appl. No. 08/469,491, filed Jun. 6, 1995.
Yue; Examiner Interview Summary Record mailed Dec. 3, 1997; U.S. Appl. No. 08/469,491, filed Jun. 6, 1995.
Yue; Notice of Allowance and Fees Due mailed Dec. 9, 1997; U.S. Appl. No. 08/469,491, filed Jun. 6, 1995.
Worsham; U.S. Appl. No. 11/684,946, filed Mar. 12, 2007.
Worsham; Non-Final Rejection mailed Sep. 28, 2007; U.S. Appl. No. 11/684,946, filed Mar. 12, 2007.
Worsham; Non-Final Rejection mailed Mar. 25, 2008; U.S. Appl. No. 11/684,946, filed Mar. 12, 2007.
Yue; U.S. Appl. No. 07/936,384, filed Aug. 26, 1992.
Yue; Non-Final Rejection mailed Aug. 26, 1994; U.S. Appl. No. 07/936,384, filed Aug. 26, 1992.
Yue; Examiner Interview Summary Record mailed Sep. 1, 1994; U.S. Appl. No. 07/936,384, filed Aug. 26, 1992.
Yue; Final Rejection mailed Apr. 20, 1995; U.S. Appl. No. 071936,384, filed Aug. 26, 1992.
Yue; Examiner Interview Summary Record mailed Jun. 9, 1995; U.S. Appl. No. 07/936,384, filed Aug. 26, 1992.
Levine; U.S. Appl. No. 10/113,399, filed Apr. 1, 2002.
Levine; Non-Final Rejection mailed Jul. 27, 2004; U.S. Appl. No. 10/113,399, filed Apr. 1, 2002.
Levine; Non-Final Rejection mailed Jan. 26, 2005; U.S. Appl. No. 10/113,399, filed Apr. 1, 2002.
Levine;Notice of Allowance and Fees Due mailed Jul. 20, 2005; U.S. Appl. No. 10/113,399, filed Apr. 1, 2002.
Levine; Notice of Allowance and Fees Due mailed Aug. 22, 2005; U.S. Appl. No. 10/113,399, filed Apr. 1, 2002.
Waite & Terrill: "Automatic Call Distribution," Inbound/Outbound Magazine, May 1990, pp. 36-41.
Popular Science: "Smart Phone," Popular Science, Jun. 1992, 1 page.
Crump: "Cellular Phones," A Layman's Guide, Oct. 1985, pp. 118-121.
"SS7 and BTNUP Messages Types", www.cisco.com, downloaded off the world wide web on Feb. 10, 2006, 6 pages.
"SS7-ISUP—Message Format, Messages, Parameters, and Timers," www.asknumbers.com, downloaded from the world wide web on Apr. 10, 2006, 7 pages.
"SS7-ISUP—Messages," www.asknumbers.com, downloaded from the world wide web on Apr. 10, 2006, 17 pages.
"SS7-ISUP—Parameters," www.asknumbers.com, downloaded from the world wide web on Apr. 10, 2006, 10 pages.
"Bell Atlantic Service Advertisement for Return Call, Caller ID and Answer Call", Feb. 1990 and Jul. 1992 (U.S. Appl. No. 08/623,121, filed Mar. 28, 1996).
Newsom: "Merlin Voice Mail VM600", British Telecommunications Engineering, vol. 4, Apr. 1985, pp. 32-35 (U.S. Appl. No. 08/623,121, filed Mar. 28, 1996).
Holt; Non-Final Rejection mailed Jun. 30, 2008 for U.S. Appl. No. 11/611,346, filed Dec. 15, 2006.
Website address: www.simulring.com/public/... ; entitled: Simulring™ ; 26 pages; printed Mar. 4, 2002.
Holt, et al., Non-Final Office Action, mailed Sep. 13, 2007, filed Dec. 15, 2006, U.S. Appl. No. 11/611,346.
Holt, et al., Non-Final Office Action, mailed Jan. 7, 1999, filed Jun. 16, 1997, U.S. Appl. No. 08/876,839.
Holt, et al., Non-Final Office Action, mailed Aug. 17, 1999, filed Jun. 16, 1997, U.S. Appl. No. 08/876,839.
Holt, et al., Final Office Action, mailed Jan. 20, 2000, filed Jun. 16, 1997, U.S. Appl. No. 08/876,839.
Holt, et al., Non-Final Office Action, mailed Sep. 13, 2000, filed Jun. 16, 1997, U.S. Appl. No. 08/876,839.
Holt, et al., Final Office Action, mailed Aug. 1, 2001, filed Jun. 16, 1997, U.S. Appl. No. 08/876,839.
Holt, et al., Non-Final Office Action, mailed Feb. 26, 2002, filed Jun. 16, 1997, U.S. Appl. No. 08/876,839.
Holt, et al., Final Office Action, mailed Sep. 10, 2002, filed Jun. 16, 1997, U.S. Appl. No. 08/876,839.
Holt, et al., Notice of Allowance and Fees, mailed Jan. 24, 2003, filed Jun. 16, 1997, U.S. Appl. No. 08/876,839.
Holt, et al., Notice of Allowance and Fees, mailed Mar. 5, 2004, filed Jun. 16, 1997, U.S. Appl. No. 08/876,839.
Holt, et al., Non-Final Office Action, mailed Dec. 2, 2004, filed Jun. 16, 1997, U.S. Appl. No. 08/876,839.
Holt, et al., Notice of Allowance and Fees, mailed Jun. 8, 2005, filed Jun. 16, 1997, U.S. Appl. No. 08/876,839.
Holt, et al., Notice of Allowance and Fees, mailed Oct. 19, 2005, filed Jun. 16, 1997, U.S. Appl. No. 08/876,839.
Holt, et al., Notice of Allowance and Fees, mailed Jun. 9, 2006, filed Jun. 16, 1997, U.S. Appl. No. 08/876,839.
Worsham; Final Office Action mailed Oct. 6, 2009 for U.S. Appl. No. 11/684,946, filed Mar. 12, 2007.
Holt; Non-Final Rejection mailed May 11, 2009 for U.S. Appl. No. 11/611,346, filed Dec. 15, 2006.
Holt; Notice of Allowance mailed Dec. 27, 2010 for U.S. Appl. No. 11/611,346, filed Dec. 15, 2006.
Federal Register; "Compatibility of Wireless Services With Enhanced 911," vol. 61 No. 37; dated Feb. 23, 1996; pp. 6963-6964.

Jameson; "Low Cost, Enhanced Emergency Telephone System," Proceedings of SPIE: Telecommunications For Health Care: Telemetry, Teleradiolgy and Telemedicine, SPIE Press, Bellingham, WA; printed Feb. 18, 2002; 2 pages.

Press Release DC 96-52 "FCC Adopts Rules To Implement Enhanced 911 For Wireless Services," dated Jun. 12, 1996; 1 page.

Holt; Non-Final Office Action mailed Jun. 25, 2010 for U.S. Appl. No. 11/611,346, filed Dec. 15, 2006.

METHOD AND APPARATUS FOR ROUTING CALLS BASED ON THE IDENTIFICATION OF THE CALLING PARTY OR CALLING LINE

CROSS-REFERENCE TO RELATED APPLICATIONS

This application is a continuation of copending U.S. application Ser. No. 11/611,346, filed Dec. 15, 2006, which is entirely incorporated herein by reference, and which is a continuation of U.S. application Ser. No. 08/876,839, filed Jun. 16, 1997 and issued as U.S. Pat. No. 7,260,203 on Aug. 21, 2007, which is a continuation-in-part of U.S. application Ser. No. 08/469,491 and issued as U.S. Pat. No. 5,764,747, which is a continuation of abandoned U.S. application Ser. No. 07/936,384, filed Aug. 26, 1992, all of which are entirely incorporated herein by reference. This application is also related to U.S. Pat. No. 7,062,028, which issued on Jun. 13, 2006.

TECHNICAL FIELD

The present invention relates to the field of switched telephony, and in particular, is a method of routing calls to a subscriber based on a routing list selected in accordance with the identity of the calling party or the originating line.

BACKGROUND OF THE INVENTION

As technological advances are made in communication equipment, and computers are more highly integrated into the telecommunications networks and systems, the ultimate goal of communication service providers: obtaining "real-time", "seamless" access to all parties; is becoming an ascertainable target. "Real-time" access refers to the ability to contact a party instantaneously as opposed to paging the party or leaving a message. "Seamless" access includes the ability to reach a party regardless of the party's location, or the time of day. In achieving this goal, a party can always be contacted by callers regardless of the parties location. The task of maintaining real-time, seamless access is not trivial.

One solution presently in operation is the Personal Number System ("PNS"), which is described in commonly owned U.S. application Ser. No. 07/936,384. The PNS from Bell-South Wireless gives a subscriber the ability to be contacted by other callers regardless of the subscriber's location. This is accomplished by providing a single point of contact for each subscriber in the form of a personal number. In addition, each subscriber provides the system with communication routing information in the form of one or more "destination lists" or "routing lists". The routing list contains various directory numbers that identify phone lines where the subscriber may be accessed. Calls placed to the subscriber's personal number will be routed by the PNS to the various destination numbers until either the subscriber is located or the list of destination numbers has been exhausted.

In the PNS, the subscriber has the flexibility to change the routing lists or alter the manner in which they are utilized. Methods to alter the use of the routing lists include enabling an "override" feature. The override feature allows the subscriber to disable the use of the routing list for a particular caller or all callers, and force the incoming call to be routed to a particular alternate number. Upon disabling the override feature, the system will resume the use of the routing lists. Another feature of the personal number communication system is to allow the subscriber to provide different routing lists for different days of the week or specific time slots within the day. Thus, one routing list may be used on weekdays from 9:00 AM to 6:00 PM, another routing list on weekdays after 6:00 PM, and a third routing list on weekends.

The general operation of the PNS call routing feature can be described in the following steps:

(1) When a call is placed to a subscriber's personal number, the telephone system will intercept the call.

(2) The telephone system will then identify the called number as belonging to a subscriber of the personal number communication system and will then determine the type of service to be provided.

(3) Finally, if the call requires routing, a routing list will be retrieved and call attempts to the various destinations will be made until the subscriber is located; however, if the subscriber cannot be located, the incoming call will be routed to a default destination such as voice mail.

More specifically, when a call is received, the PNS determines if the called personal number requires facsimile services. If so, the system will determine whether the call attempt is a facsimile transmission. If the call is a facsimile transmission, then the call will be redirected to a device to store the facsimile data until the subscriber, at a later time, retrieves this information. If the call attempt is not a facsimile transmission, then the system will determine whether the call is an administration call. An administration call is initiated by the subscriber and allows the subscriber to modify his service options, retrieve any voice mail that might have previously been stored, or obtain download of prior facsimile transmissions.

Finally, if the call requires a routing service, the PNS will identify the calling party and prepare an identification announcement for the subscriber. The identity of the calling party may be determined in several ways. One method is by performing a reverse white pages database lookup using the phone number of the calling party as a search key. Alternatively, the identity can be obtained by prompting the calling party to provide identification information by keypad entries. Once the identity is determined, an identification announcement message is prepared based on the calling parties identification. The PNS also may provide the calling party with a personal greeting from the subscriber, or a standard greeting. The greeting requests the calling party to hold while an attempt to locate the subscriber is performed.

While the calling party is holding, the PNS continues by retrieving a routing list for the subscriber. The routing list can be selected from several routing lists based on the time of day, day of the week, or any other system established criteria. The numbers in the selected routing list will be sequentially accessed until either the call has been successfully routed, rejected, or the list has been exhausted. The routing operation is performed by selecting a first directory number from the routing list and redirecting the telephone call to that number.

If the call is answered, the identification announcement is delivered to the answering party. The answering party is prompted to provide disposition information indicating whether the call is formally accepted of formally rejected. A formal acceptance occurs when the call is answered and the answering party provides and indication that the call is accepted. This indication may take the form of pressing a key on the phone to transmit a particular dual tone multi-frequency (DTMF) signal or simply maintaining the phone in an "off-hook" state for a specific period of time. A formal rejected occurs when the call is answered and the answering party decides not to accept the call. Similar to a formal acceptance, a formal rejected can include pressing a key to transmit a DTMF signal. In addition, the party can return the receiver to an "on-hook" state within a specific period of time. A call is considered to be successfully routed when either a formal acceptance or formal rejection is received. If the call is not formally accepted or formally rejected, then the call is informally rejected. An informal rejected implies that the call was not successfully routing to the destination. This can occur when the call is (a) not answered, (b) a busy signal is received, or (c) the call is answered by an answering machine, recording or error message.

In response to the call being formally accepted, the PNS routes the communication to the successful destination. In response to the call being formally rejected, the PNS routes the communication to a default destination which can be specified by the subscriber. In response to the call being informally rejected, the system then attempts to route the call to the next destination in the routing list and again requests communication disposition information. The system continues to request communication disposition information from each sequential destination in the routing list until the communication is formally accepted, formally rejected or until the last destination on the routing list is reached. Once the destinations on the routing list have been exhausted, the communication is routed to a last or a default destination.

While the PNS has made substantial advances towards providing seamless access to a subscriber, there is a desire for achieving this level of service in a more efficient manner. One method to improve the efficiency of this service would be to include the ability to select a routing list for an incoming call based on the identity of the calling party or a calling line identification (CLID). The need for this capability exists in both the realms of business and personal calls. For instance, a sales representative visiting a first customer's office would not want to have calls from a competing customer routed to him at that location; however, it would be desirable to have calls from an expecting wife routed to that location. In addition, a subscriber may want to route calls differently based on the type of call (i.e., business, personal, solicitations). The ability to route calls based on the identification of the calling party or calling line is advantageous because a subscriber can (a) limit interruptions due to personal calls; (b) reduce the amount of hold time required for business calls by eliminating routing locations where the subscriber would not be found during business hours; (c) give priority service to important calls; and (d) give restrictive service to unwanted calls.

One way to implement this routing capability is to utilize separate routing lists that are selected based on the identification of the calling party, the type of call, or the originating line.

Therefore, there is a need in the art for a method that would route calls to a party based on the identity of the calling party.

Further, there is a need in the art for a method to route calls to a party based on the type or purpose of the call.

Furthermore, there is a need in the art for a method to route calls based on the identity of the originating line.

SUMMARY OF THE INVENTION

The present invention provides an improvement in the utility of the Personal Number System (PNS). Stated generally, the present invention provides a method to select a routing list based on the Identity of the calling party or the originating subscriber line. The current capabilities of the personal number communication system remain intact. A subscriber provides multiple routing lists to the system and identifies the parties and subscriber lines that are to be associated with each list. Because it is not feasible to identify all possible calling parties or originating subscriber lines, a default list can also be provided.

Upon receiving a call to a PNS subscriber, an appropriate routing list will be selected. At this point, the operation of the personal number communication system can continue as described above by selected a destination from the routing list and attempting to route the call to that destination. The overall effect of the present invention is to route calls to the subscriber in the most efficient manner by limiting interruptions of the subscriber's business activities by personal calls and providing privacy for a subscriber when he is at home or on personal business.

Therefore, it is an object of the present invention to enhance the personal number communication system by providing a method to route calls to a party based on the identity of the calling party.

It is a further object of the present invention to route calls to a party based on the type or purpose of the call.

It is also a further object of the present invention to route calls based on the identity of the originating subscriber line.

These and other objects, features, and advantages of the present invention will bee more clearly understood and appreciated from a review of the following detailed description of the disclosed embodiments and by reference to the appended drawings and claims.

DETAILED DESCRIPTION OF THE PREFERRED EMBODIMENT

The present invention provides an improves method for routing calls to a subscriber based on the identity of the calling party, the type of call, or the originating subscriber line. A subscriber provides routing lists identifying the destination numbers where the subscriber may be found. Each of the routing lists are associated with one or more calling parties. As calls are received, the system will identity the calling party of line and select a routing list in accordance with this information. Thus, received calls are routed in accordance with a routing list selected on the basis of the identity of the caller, the call type or the calling line. Utilizing this method, performance advantages over the known art are gained because subscribers can minimize interruptions to their business day, avoid receiving business calls at inopportune moments, and limit their access by certain callers while expanding their access to others.

Public Switched Telephone Network

Figure 1:
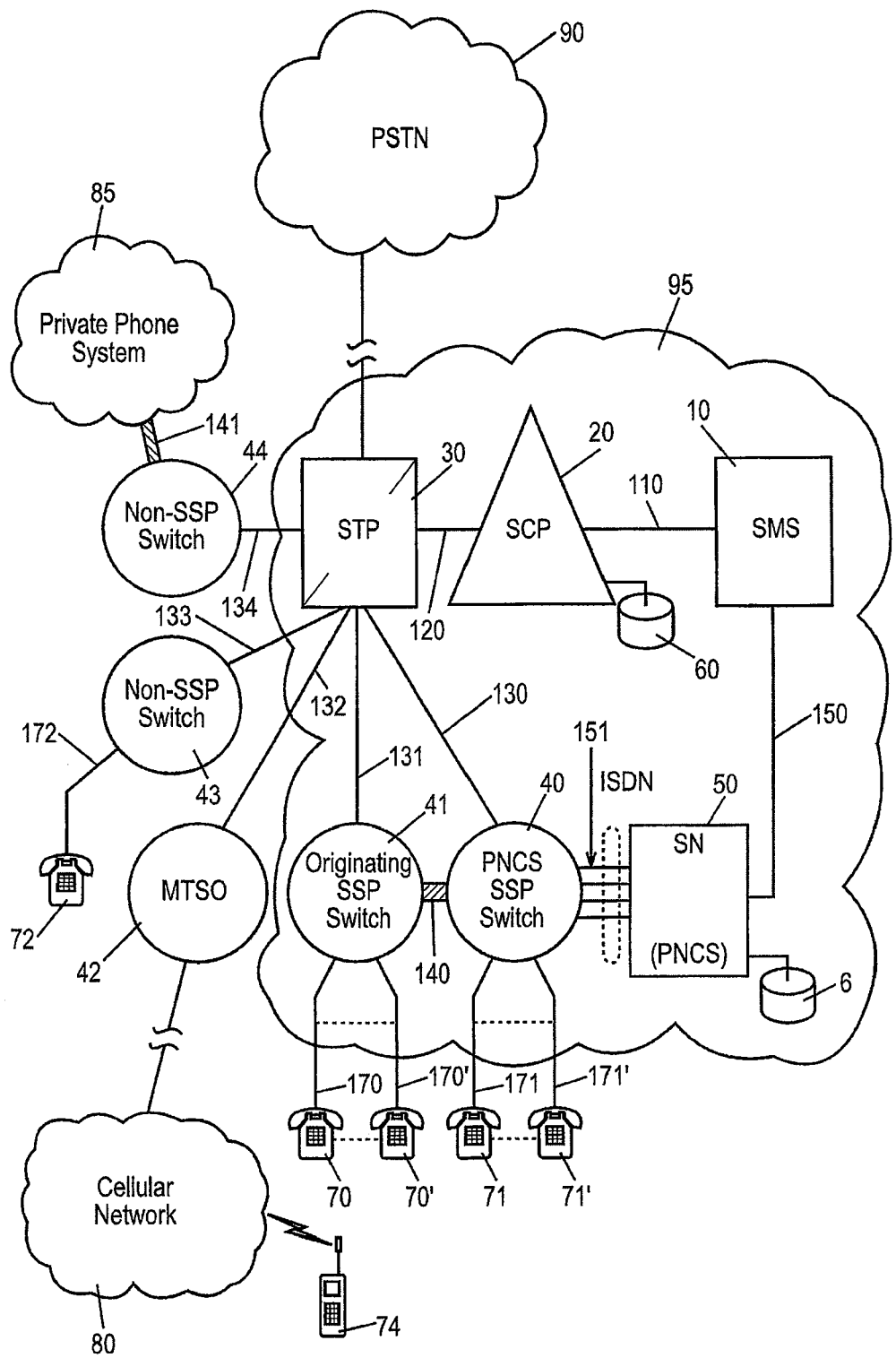
FIG. 1 is a diagram depicting the present invention as operating within an integrated portion of a public switched telephone network (PSTN).

Referring now to the drawings, in whish like numerals represent like elements throughout the several figures, the present invention and the preferred operating environment will be described. FIG. 1 is a diagram depicting the present invention as operating within a representative portion of the public switched telephone network 95. Generally, the public switched telephone network is comprised on a variety of interconnected computer systems. The modern configuration of the public switched telephone network operates by centralizing complex operations within the telephone system into specific processing units, whereas, the more simplistic functions such as basic call setup and tear down, remain distributed throughout the network. The representative portion of the public switched telephone network 95 in FIG. 1 is functionally connected to a variety of integrated telephony systems including a cellular network 80, a private phone system 85 and the public switched telephone network 90. This representative portion is typical of configurations provided by the Regional Bell Operating Companies (RBOC) throughout the U.S., and is shown as comprising a Service Management System 10, a Service Control Point 20, a Service Transfer Point 30, Service Switching Points 40 and 41, and a Service Node 50.

The Service Management System 10 performs the high-level operations of the phone network. The functions of the Service Management System 10 include: (a) downloading information to Service Control Point 20 databases 60 when new subscribers are added or subscribers modify their ensemble of services; (b) performing data reloads when a Service Control Point 20 crashes or software needs to be updated; (c) implementing high volume routing services, such as call forwarding and 800 number translation and routing; (d) maintaining and providing access to high volume databases for the authorization of billing, such as credit card number validations; and (e) downloading, on a non-real-time basis, billing information that is needed in order to appropriately invoice telephone company subscribers for the services provided.

The Service Control Point 20 and the Service Management System 10 are interfaced over a digital data link 110. The Service Control Point 20 operates in the telephone network to maintain a network database 60 used in determining which subscribers require the support of enhanced services, screening calls, routing calls, and authorizing specific features. Generally, Service Control Points are used for database look up and routing services that take place prior to the logical completion of the call, (i.e., the provision of a ringing signal to the called subscriber line and ring back to the calling subscriber).

The Service Node 50 and the Service Management System 10 are interfaced over a digital data link 150. Generally, a Service Node provides resources for performing specialized services for the system and subscribers. A typical Service Node 50 will have resources such as database 61, voice signal detection, DTMF signal recognition, voice synthesis devices, voice digitization, and storage capabilities. In most local exchange carrier networks a Service Node provides enhanced features or services that require an audio connection to the caller or transfer of a significant amount of data to a subscriber over a switched connection during or following a call. Services that are implemented during a call (i.e., after completion of ringing or called subscriber pick up) usually employ the facility of a Service Node. Thus, Service Node 50 is a highly suitable platform for the present invention.

Service Switching Points typically interface to a Service Node via an ISDN link such as ISDN link 151 between Service Switching Point 40 and Service Node 50. Service Switching Point 41 may also be connected to Service Node 50. The Service Switching Points 40 and 41 are the modern equivalents of central office switches. Generally, Service Switching Points operate by transmitting trigger messages or queries to other components and receive and process responses from the same. A trigger message is used to inform the phone network of an event or a state change that has occurred at a Service Switching Point. When a set of predetermined conditions are detected, Service Switching Points 40, 41 will operate to:

(a) initiate a trigger associated with the specific call processing state for the present call on a subscriber line;

(b) generate and transmit an appropriate trigger message to another phone network component; and (c) suspend call processing for the present call until a response is received from the component.

The received response will instruct the Service Switching Point 40, 41 to take certain actions in processing the present call. If the Service Switching Point 40, 41 does not receive a response from the network component, a default task will be executed upon the expiration of a default timer. As a specific example, when a call setup attempt is received at a Service Switching Point 40, 41, a termination attempt trigger message is transmitted.

Service Switching Points may also be connected to each other via a trunk circuit. Service Switching Points 40 and 41 are connected in this manner via trunk circuit 140. The trunk circuits provide the physical voice paths between parties. Each Service Switching Point 40, 41 services several subscriber lines. Service Switching Point 40 is shown as interfacing with termination equipment 70-70' via subscriber lines 170-170'. Likewise, Service Switching Point 41 services termination equipment 71-71' via subscriber lines 171-171'.

Each subscriber line within a particular U.S. area code of the public telephone switching network is identified by a unique seven digit destination number or directory number. Thus, when a party calls a particular destination number, the call is routed to the subscriber line identified by the destination number. Certain destination numbers, such as the personal numbers in the PNS, are reserved for special uses. Thus, rather than being associated with a subscriber line, a call placed to a personal number will be directed to a service node or some other entity, which will process the call.

Finally, Signal Transfer Points in the phone network are utilized in linking the Service Switching Points to Service Control Points. In FIG. 1, Service Control Point 20 interfaces to Signal Transfer Point 30 via digital data line 120 and Signal Transfer Point 30 interfaces with Service Switching Points 40 and 41 via digital data links 130 and 131 respectively. Digital data packets flowing between the Service Control Points 20 and Service Switching Points 40, 41 go through Signal Transfer Point 30. Thus, the Signal Transfer Point 30 is not normally the destination of a packet, but merely directs traffic among the other entities on the network that generate and respond to the data packets.

The representative portion of the public switched telephone network 95 interfaces to the cellular network 80 through digital data line 132 and mobile telephone switching office (MTSO) 42. Thus, calls can be received from or routed to a cellular phone 74. The public switched telephone network must also interface with switching offices that are not compatible with the Service Switching Points. Thus, subscriber line 172 attached to termination equipment 72 can be accessed via switching office 43 and digital data line 133, and the private phone system 85 can be accessed via trunk circuit 141 from switching office 44 on digital data line 134.

In summary, the PNS can reside as a combination of one or more program modules and hardware components, within a Service Node operating in the public switched telephone network. In this configuration, calls received for a subscriber can be routed to other destinations within the public switched telephone network, cellular phones, private phone systems or to any other destination attached to the public switched telephone network either locally, long-distance or internationally.

Operation within the PSTN

Figure 2:
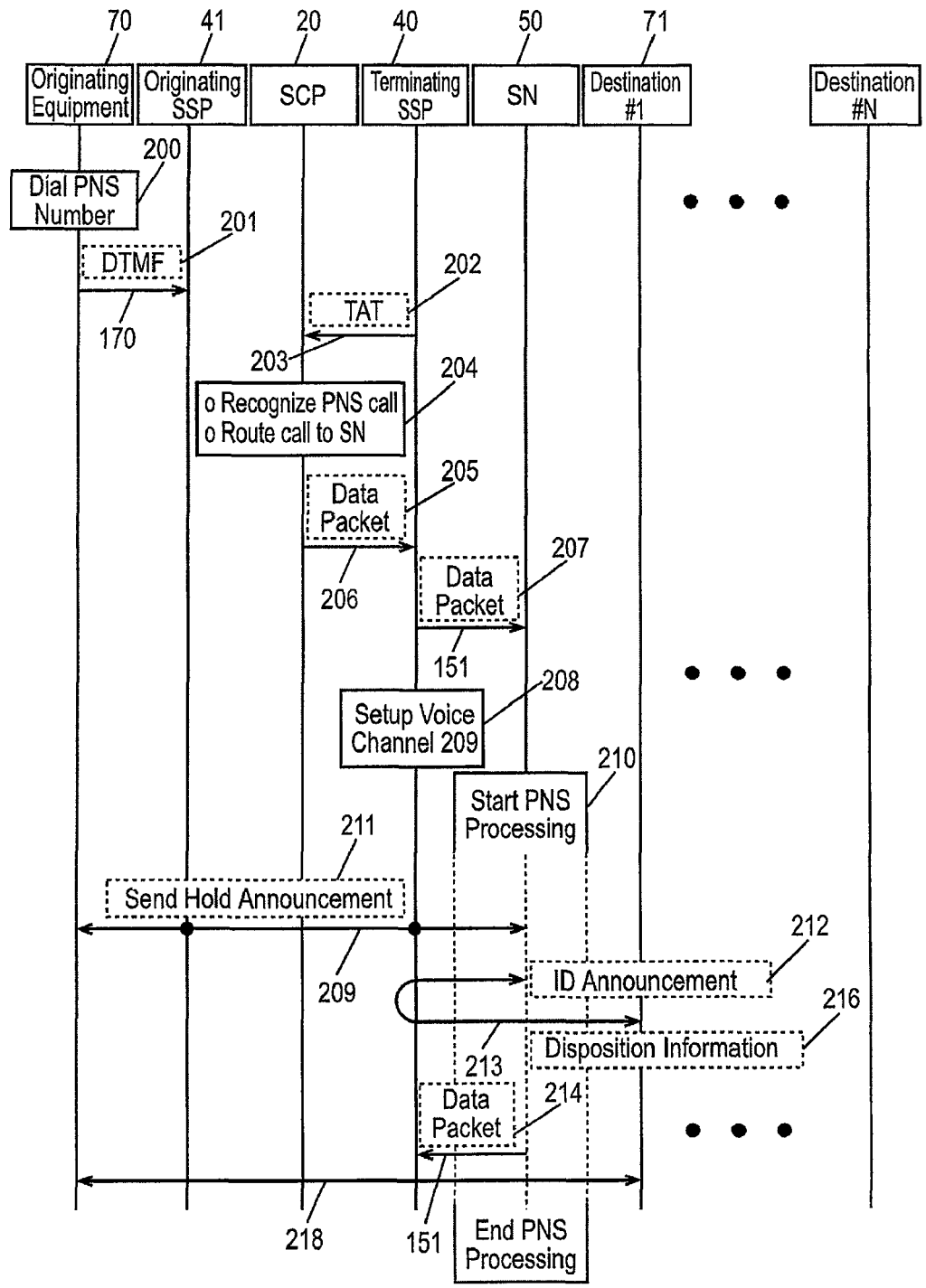
FIG. 2 is a diagram illustrating the various components identified in FIG. 1 interacting during a call to a PNS subscriber.

FIG. 2 is a diagram illustrating the various components, identified in FIG. 1, interacting with each other during a call to a PNS subscriber. Thus, this diagram illustrates the integration of the PNS system into an integrated computer telephony system. The PNS system for this example operates on Service Node 50, is serviced by service switching point 40 and its database 61 is initially loaded with subscriber information (i.e., routing list and subscriber services) from Service Management System 10.

Initially, process block 200 indicates an originating party utilizing origination equipment 70 dials the personal number of a PNS subscriber. DTMF signals 201, representative of the personal number, are transmitted over subscriber line 170 to the originating service switching point 41. The originating service switching point 41 will initiate a call attempt through the service switching point 40 servicing the PNS system. The details of this process are well known to those skilled in the art and are not included in FIG. 2. Service Switching Point 40 responds to the call initiation by transmitting a termination attempt trigger (TAT) message 202 to Service Control Point 20 through communication path 203. The details of communication path 203 (not shown in FIG. 2) include the links of digital data lines 131 and 120 being connected through by Signal Transfer Point 30 (shown in FIG. 1).

At Service Control Point 20, the termination attempt trigger message 202 is recognized as a PNS call attempt as shown in process block 204, and the call is then routed to Service Node 50. Other services are performed by Service Control Point 20 such as providing ring back and busy indicators to the originating Service Switching Point 41; however, the details of these processes are well known to those skilled in the art and are not necessary in describing the embodiments of the present invention. Specifically, the process of routing the call to the Service Node 50 is well known to those skilled in the art and is generally shown in FIG. 2 as being accomplished by transmitting a digital data packet 205 to the terminating Service Switching Point 40 over communication path 206, and then Service Switching Point 40 transmitting another digital packet 207 to the Service Node 50 over ISDN link 151. In process block 208, the Service Switching Point 40 sets up a voice path 209 between the Service Node 50 and the originating source 70.

Service Node 50 recognizes the incoming call request as a PNS call and initiates PNS processing 210. The PNS transmits a hold announcement 211 to the originating party over voice path 209, attempts to identify the originating party, and then prepares an identification announcement 212 for the subscriber. The hold announcement 211 requests the originating party to hold while the call is routed. While the originating party is holding, Service Node 50 retrieves a routing list and attempts to route the call to the subscriber at one of the destinations in the routing list. For each destination, Service Node 50 will originate a call to the destination number to establish a voice path between the Service Node 50 and the destination. FIG. 2 illustrates voice path 213 between Service Node 50 and destination 71. Although the details of establishing a connection between service node 50 and the various destinations is not shown these procedures are well known to those experienced in the field of telephony.

For each destination selected, a voice path similar to 213 is established, and identification announcement 212 is delivered. The answering party provides disposition information 216 to Service Node 50 indicating whether the call is formally accepted or formally rejected. If the call is formally accepted then a data packet 214 is transmitted to the terminating Service Switching Point 40 which will ultimately result in bridging the communication path 218 between originating equipment 70 and the equipment located at the successful destination. If the disposition information indicates a formal rejection, then a default destination is selected and a voice channel is set up between originating equipment 70 and the default destination. Finally, if the call is informally rejected, then the next destination is selected from the routing list and a voice channel between the Service Node and the next destination is established, an announcement is delivered, and disposition information is requested.

Figure 3A:
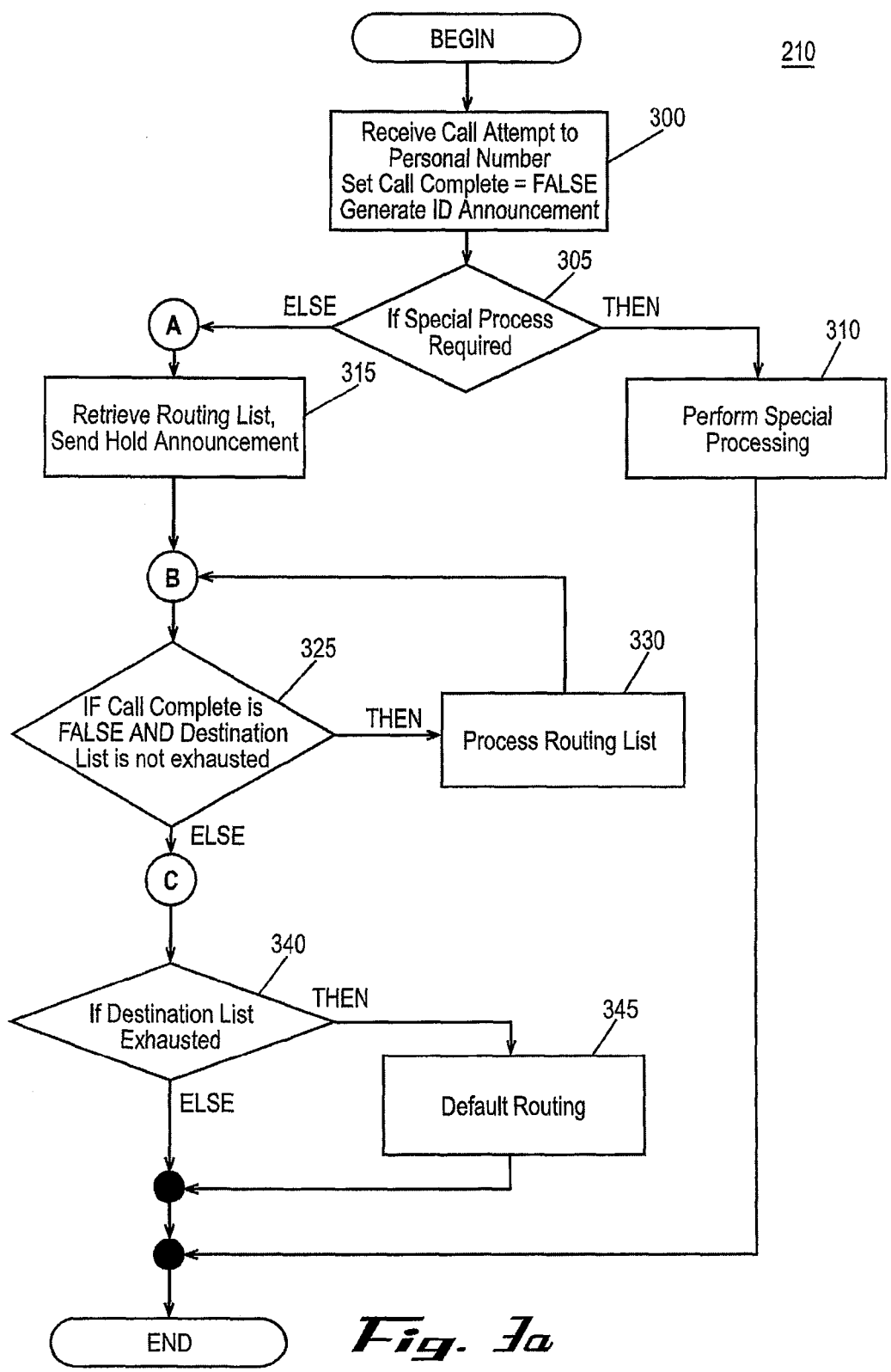
FIGS. 3a-b are flow diagrams illustrating the operation of the PNS in response to receiving a call to a personal number.
Figure 3B:
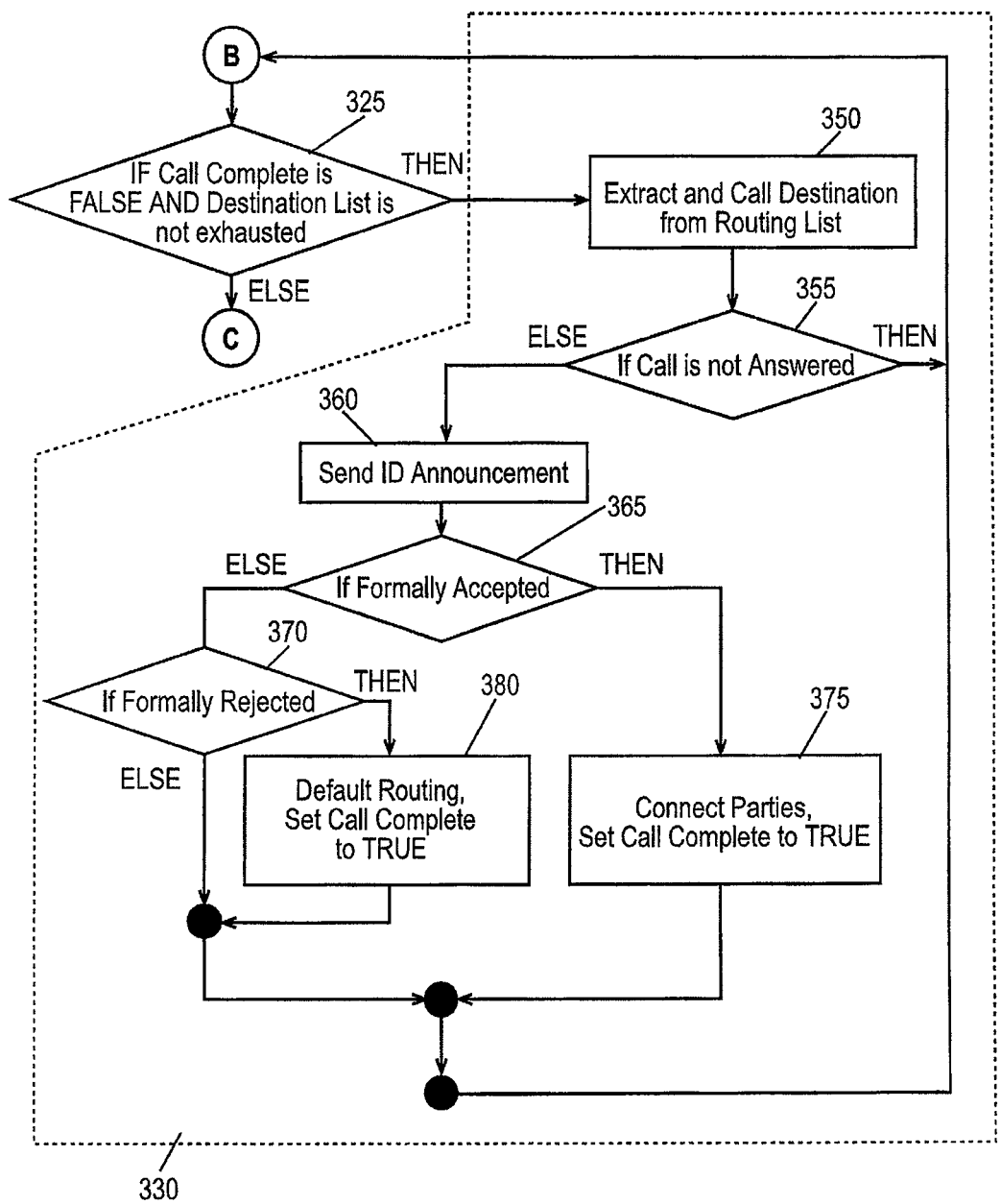

Now turning to the details of the PNS processing 210 of a call, FIGS. 3a and 3b are flow diagrams illustrating the operation of the PNS in response to receiving a call to a personal number. Turning to FIG. 3a, process block 300 illustrates the reception of the personal number call. In process block 300 a Call Complete indicator is initialized to FALSE and an identification announcement (212 in FIG. 2) is generated. In decision block 305, the PNS determines whether the call requires special processing such as facsimile reception or administrative functions. If special processing is required, process block 310 is entered where the special processing is performed, the Call Complete indicator is set to TRUE, and PNS processing 210 is exited. If the call does not require special processing (i.e., the call is to be routed to a personal number subscriber), process block 315 is entered to retrieve a routing list and send a hold announcement (211 in FIG. 2) to the originating party.

When decision block 325 is entered for the first time, the Call Complete indicator is FALSE and the retrieved routing list has not been exhausted. Thus, the THEN branch of decision block 325 is followed to process block 330. In process block 330, the first destination from the routing list is extracted and an attempt to route the personal number call to the first destination is initiated. Processing will continue between decision block 325 and process block 330 until the call is completed or the routing list is exhausted. When either of these two events occur, decision block 340 will be entered to determine the reason for exiting the loop comprising decision block 325 and process block 330. For the case where the routing list has been exhausted, the THEN branch of decision block 340 is followed to process block 345 where the call is routed to a default destination prior to exiting the PNS operation. Otherwise, the ELSE branch of decision block 340 is followed and PNS processing 210 is exited.

Turning now to FIG. 3b, the details of process block 330 and the operation of the loop including decision block 325 and process block 330 are provided. In process block 350, a destination number is extracted from the routing list and the personal number call is routed thereto. If the call is not answered at the first destination, the THEN branch of decision block 355 is followed and processing returns to decision block 325. If the call is answered at the first destination, the ELSE branch of decision block 355 is followed to process block 360. The identification announcement (212 in FIG. 2) is transmitted to the party answering the call in process block 360. The identification announcement 212 can be used to (a) identify the originating party, (b) identify the party the call is intended for, (c) request disposition information concerning the call, or a combination of (a-c). In either case, once the call is answered, the PNS waits for disposition information concerning the call before proceeding to decision block 365. The disposition information can be either an action or inaction by the answering party.

The disposition information will contain a formal acceptance or a formal rejection of the call. If the call is not answered, it is informally rejected and the ELSE branches of decision block 365 and decision block 370 will be followed and processing will return to decision block 325. Because the Call Complete indicator is still FALSE, if the routing list has not been exhausted, the THEN branch of decision block 325 will be followed again to process block 350 where the next destination will be extracted from the routing list and the personal number call will be routed thereto. If the next destination results in another informal rejection, this process will continue until the reception of a formal acceptance or formal rejection, or until the routing list is exhausted.

Returning to decision block 365, if the personal number call is formally rejected, the ELSE branch of decision block 365 is followed, and the THEN branch of decision block 370 is followed to processing block 380. The call is routed to a default destination in processing block 380. This generally includes routing the call to a voice mail service. In addition, in process block 380, the Call Complete indicator is set to TRUE and decision block 325 is entered. Again, in process block 365, if the personal call is formally accepted, the THEN branch of decision block 365 will be followed to process block 375. In process block 375, the establishment of a voice path between the originating party and the subscriber will be initiated, the Call Complete indicator will be set to TRUE, and processing will continue in decision block 325.

Returning again to FIG. 3a, if the Call Complete indicator is set to TRUE due to a formal acceptance or a formal rejection, the ELSE branch of decision block 325 will be followed to decision block 340. If the Call Complete indicator is set to FALSE, but, the routing list has been exhausted, this will also result in following the ELSE branch to decision block 340. In either case, processing will then proceed as described above, and the PNS operation will be exited.

Figure 4:
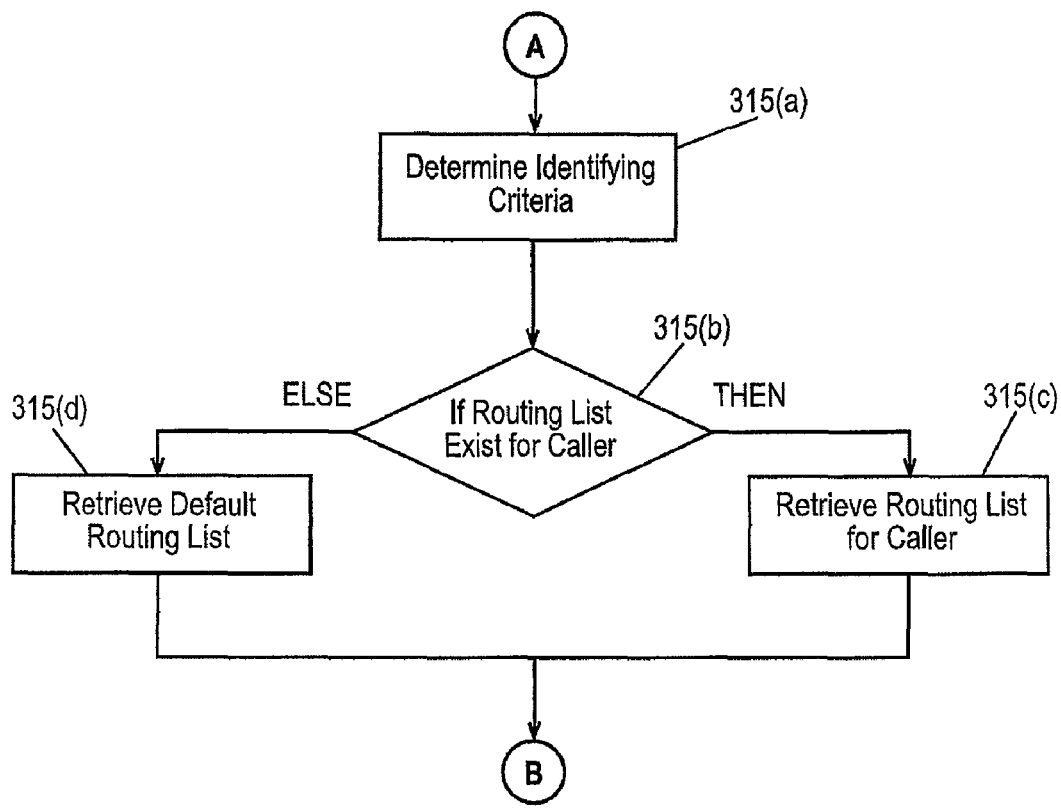
FIG. 4 is a flow diagram illustrating the enhancements that the present invention provides to the PNS.

Now turning to FIG. 4, the enhancements to the operation of the PNS provided by the present invention are illustrated. In FIG. 4, blocks 315(a-d) replace process block 315 of FIG. 3a. In process block 315(a), the identifying criteria is determined. The identifying criteria defines the basis for selecting a routing list. This criteria may include the identity of the calling party, the type of call, the calling line identification (CLID), or other similar information. This process can be accomplished in a variety of methods and the specific examples provided herein are intended for illustrative purposes only and do not restrict the scope of this application in any manner. If the routing list is being selected based on the identification of the calling party, the system may prompt the calling party for identification information. The calling party can provide the identification information in the form of a DTMF code, a menu selection or by providing a speech sample. If the routing list is being selected based on the type of call, the system may prompt the calling party to identify the type of call. The calling party may enter a DTMF code to select a specific call type or select a call type from a menu selection list. Finally, if the routing list is being selected based on the identification of the calling line, the system may detect and decode the caller identification information transmitted over the phone line. Alternatively, the system may prompt the calling party to enter a DTMF code to identify the calling line. Other criteria can also be employed in making this determination such as utilizing the time of day or the day of the week to identify the call as a business or personal call. In addition, calls can be given special treatment based on the originating area codes.

Once the identifying criteria is determined for the call, decision block 315(b) is entered. In decision block 315(b), if a routing list in corresponding to the identifying criteria exists, the THEN branch is followed to process block 315(c) where the routing list is retrieved. If a routing list does not exist that meets the criteria identified, the ELSE branch of decision block 315(b) is followed to process block 315(d) where a default routing list is retrieved.

One embodiment of the invention is to select a routing lists based on the originating calling line identification. The PNS could require a dedicated routing list for each calling line and use the default routing list in the absence of a dedicated routing list. Alternatively, the PNS could use one routing list for a group or class of calling line identifications. For instance, calls from a particular area code may invoke the use of one list, while local calls may invoke the use of another list. This could also be expanded to use a routing list based on the exchange of the originating line. Thus, calls received from downtown exchanges may have a tendency to be business related and would invoke the use of a business oriented list. On the other hand, calls received from suburban exchanges may have a tendency to be non-business related and would invoke the use of a personal list. Additionally, calls from cellular exchanges could also use a separate routing list.

In another embodiment of the invention, the calling party may be requested to provide identification information to the PNS. This could take the form of entering a code on the keypad, selecting an identification from a menu driven list, or performing speech recognition for a spoken identification from the caller. This information can then be used in determining which routing list to retrieve. If the PNS uses a code to identify the caller, the subscriber can provide routing lists for each code or group of codes. In operation, the subscriber can provide separate codes for business associates, vendors or salesmen, friends and family. Here, a routing list could be selected based on the type of code entered. Alternatively, the subscriber can provide a unique code to each person and maintain more flexibility in routing calls on an individual basis. If the PNS uses a menu driven list to perform the caller identification process, the calling party may be required to enter digits from the keypad to select from various options. In this embodiment, the system can provide additional flexibility to the subscribers. For instance, the menu system can be used to identify the caller or class of caller as well as selecting routing list for other special circumstances such as weekend calls, business hour calls and emergency calls.

Operation within Private Phone Systems

Figure 5:
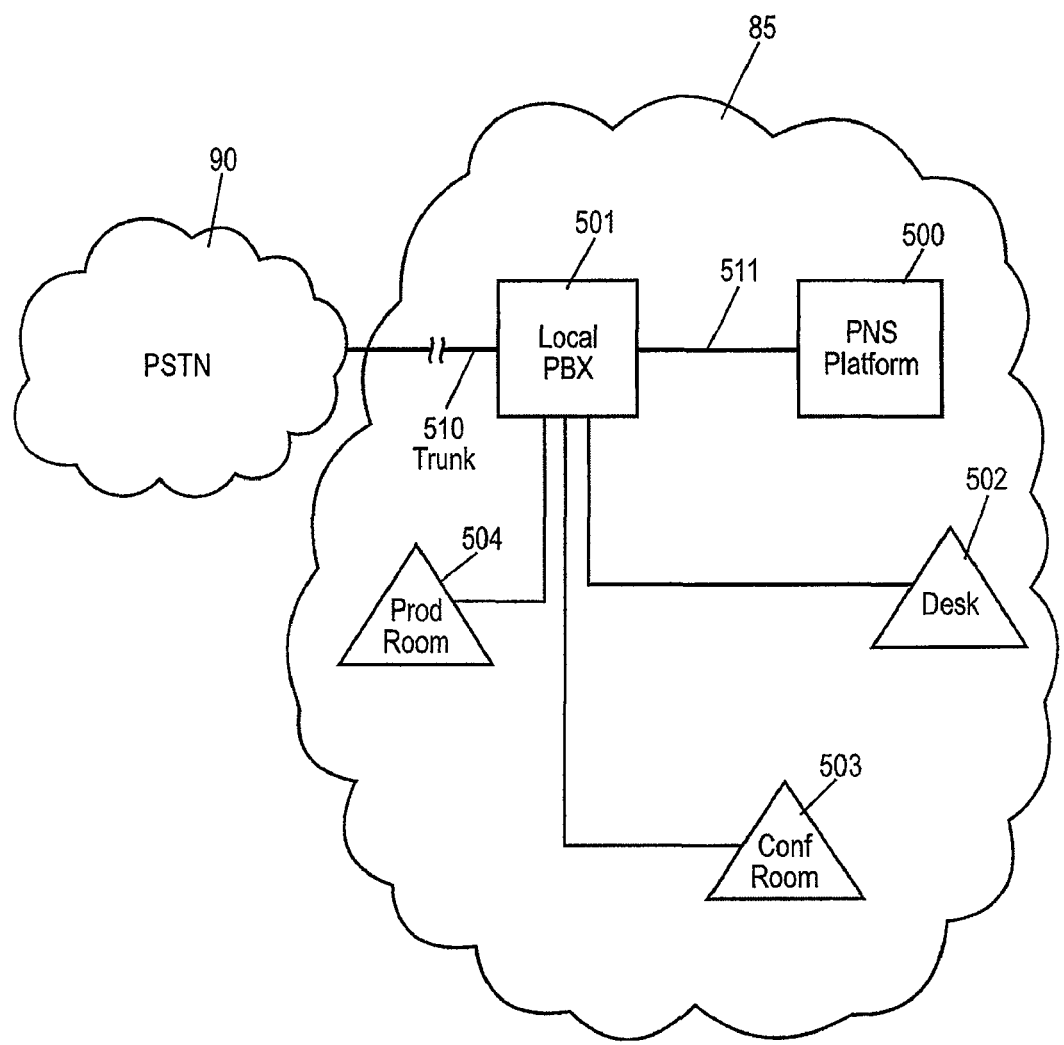
FIG. 5 illustrates the embodiment of the present invention within a private phone system.

In addition to being implemented within the public switched telephone network, the present invention can also be implemented within the context of a private phone system. In a large office, individuals may be required to move between locations within the confines of the private phone system. In this scenario, the individuals may want calls identified as internal calls to be routed to all the various office locations where the party may be located, whereas, calls identified as external calls may only be routed to a subset of possible locations. FIG. 5 illustrates the embodiment of the present invention within a private phone system 85. A private branch exchange (PBX) 501 interfaces to the public switched telephone network 90 through one or more trunk lines 510. Generally, a PBX is a telephony switching system that is either owned or leased by a business and provides switching functions for internal calls and an access to the public switched telephone network. The PNS platform 500 interfaces to the local PBX 501 on interface line 511. The PNS operates on calls within the system as well as external calls coming into the local PBX 501. In response to receiving a call, the PNS platform 500 can then select a routing list and route the call to various locations within the private phone system 85 in accordance with the present invention. Thus, an individual within the private phone system 85 can be reached at their desk 502, a conference room 503, a production room 504 or a plurality of other locations within the private phone system. In addition, the PNS platform 500 can operate to route calls to external locations through PBX 501.

Figure 6:
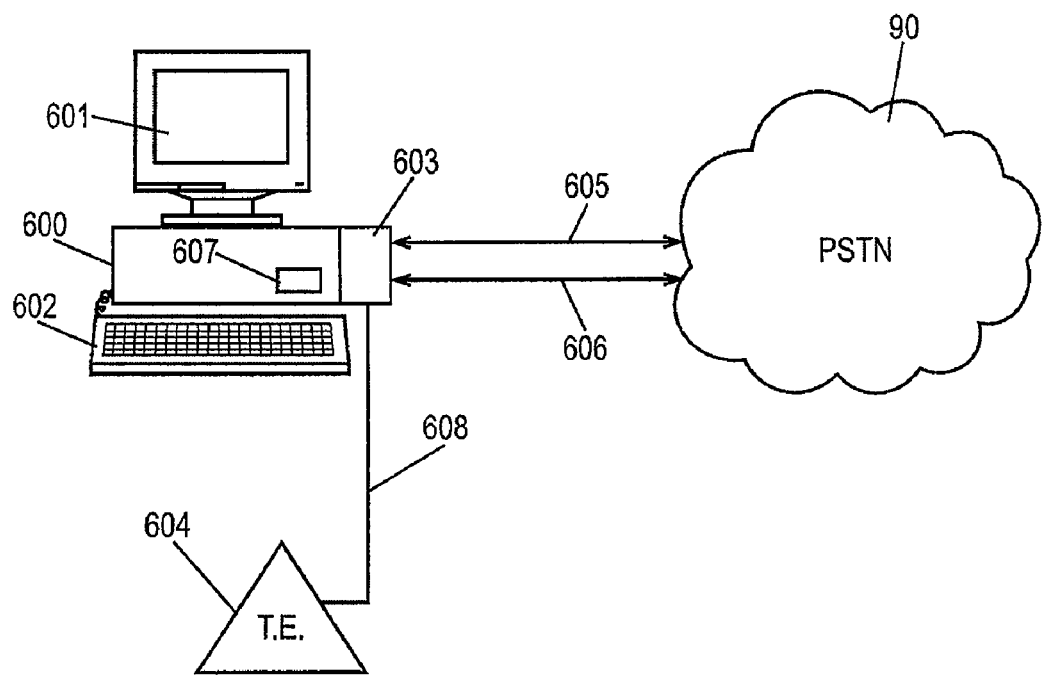
FIG. 6 illustrates another embodiment of the present invention.

FIG. 6 illustrates another embodiment of the present invention. In this embodiment, a conventional personal computer operates as the platform for the PNS implemented as a program module. The personal computer consist of the processing unit 600 which interfaces to a storage media 607, a display device 601 and a user input device 602. Access to the public switched telephone network 90 is provided through an interface device 603 which supports at least two public switched telephone network subscriber lines 605 and 606. In addition, local terminating equipment 604 may also be connected to one or more of the subscriber lines through local line 608 and interface device 603.

Routing lists can initially be entered into the PNS platform 600 through the input device 602 or by inserting a storage media 607 containing the routing lists.

The processing unit 600 can detect the reception of a call on one of the subscriber lines by either receiving a signal from interface device 603 or by polling the interface device 603. If a call is received on one of the subscriber lines (605 for illustrative purposes), the processing unit will operate to retrieve a routing list from storage media 607 based on the identity of the calling party or originating line. Routing attempts can then be made on the other subscriber line 606 to the destinations in the routing list. When a call is successfully routed, the processing unit can instruct the interface device to bridge the two subscriber lines.

From the foregoing description, it will be appreciated that the present invention provides a method to route calls to a subscriber based on the identification of the calling party, type of call, or originating line. Although the present invention has primarily been described as being embodied in the PNS operating within the public switched telephone network, it can be appreciated that the present invention can be utilized in any telecommunications call routing system. Indeed, the present invention is not limited to any particular telephony system or application.

The foregoing method of the present invention may be conveniently implemented in one or more program modules as well as hardware components. No particular programming language has been indicated for carrying out the various tasks described above because it is considered that the operation, steps, and procedures described in the specification and illustrated in the accompanying drawings are sufficiently disclosed to permit one of ordinary skill in the art to practice the instant invention. Moreover, in view of the many different types of computers, computer platforms and program modules that can be used to practice the instant invention, it is not practical to provide a representative example of a computer program that would be applicable to these many different systems. Each user of a particular platform would be aware of the language and tools which are more useful for that user's needs and purposes to implement the instant invention.

The present invention has been described in relation to particular embodiments which are intended in all respects to be illustrative rather than restrictive. Those skilled in the art will understand that the principles of the present invention may be applied to, and embodied in, various program modules for execution on differing types of computers or computer platforms regardless of the telephony system that is being supported.

Alternative embodiments will become apparent to those skilled in the art to which the present invention pertains without departing from its spirit and scope. Accordingly, the scope of the present invention is described by the appended claims and supported by the foregoing description.

The invention claimed is:

1. A method comprising:
    storing a plurality of routing lists, each an ordered list of numbers for a user;
    a platform computer receiving a call from a caller;
    the platform computer selecting a routing list from the plurality of routing lists based on the caller; and
    the platform computer directing said call to the numbers on the selected routing list.

2. The method of claim 1, wherein selecting a routing list further comprises:
    retrieving a default routing list if a list from the plurality of routing lists is not associated with the caller.

3. The method of claim 1, further providing a calling line identification service comprising:
    receiving a calling line identification for the caller; and
    using the calling line identification to determine identifying information.

4. The method of claim 1, further comprising identifying the caller comprising:
    requesting the caller to provide a speech sample; and
    receiving the speech sample.

5. The method of claim 1, wherein selecting a routing list further comprises:
    detecting an area code associated with the caller;
    retrieving an associated routing list for the caller based on the area code; and
    retrieving a default routing list if the associating routing list does not exist.

6. The method of claim 1, wherein selecting a routing list further comprises:
    detecting an exchange associated with the caller;
    retrieving an associated routing list for the caller based on the exchange; and
    retrieving a default routing list if the associated routing list does not exist.

7. A system comprising:
    a processing unit;
    a memory storage device operative to store a plurality of routing lists for a user;
    a receiving interface device coupled to said processing unit for receiving calls;
    a transmitting interface device coupled to said processing unit for placing calls;
    said processing unit being operative to:
        receive a call on the receiving interface device from a caller directed to the user;
        detect identifying information for the caller;
        retrieve a routing list of the plurality of routing lists associated with the caller;
        retrieve a default routing list from the memory storage device if the caller is not associated with one of the routing lists; and
        direct the call to numbers on the retrieved routing list.

8. The system of claim 7, wherein the processing unit directs the call to the numbers on the retrieved routing list by:
    (a) selecting a first number from the routing list;
    (b) routing the call to the first number;
    (c) receiving communication disposition information from the first number; and (d) if the communication disposition indicates the retrieved routing failed, selecting a second number from the routing list and repeating steps (b)-(d) at the next number.

9. A system, comprising:
a receiving element configured to receive a first communication directed to a number assigned to a user;
a routing element communicatively coupled to the receiving element, the routing element configured to access communication routing information in response to the first communication, the routing element further configured to select a first destination on a list of hierarchically arranged destinations;
the receiving element further configured to receive communication disposition information from the first destination; and
the routing element further configured to dispose of the first communication in accordance with the communication disposition information by either routing the first communication to the first destination or by selecting the next hierarchically arranged destination on the list of destinations,
wherein the receiving element and the routing element comprise one or more computer processing units.

10. The system of claim 9, wherein the list of destinations comprises a first hierarchical list and a second hierarchical list, the first hierarchical list having destinations hierarchically arranged in order of user preference for communication routing during a first period of time, the second hierarchical list having destinations hierarchically arranged in order of user preference for communication routing during a second period of time.

11. The system of claim 9, wherein the communication routing information further comprises:
an override destination,
wherein the routing element is further configured:
to select the first destination on the list of the destinations to determine if a priority override is established;
if the priority override is established, then to determine whether the source of the communication is a priority caller; and
if the source is a priority caller, then to select and route the communication to the override destination.

12. The system of claim 9, wherein the routing element is further configured:
to access the communication routing information in response to receiving a call from the user; and
to substitute a new destination for a destination in the list of destinations.

13. The system of claim 12, wherein the routing element is further configured to request the new destination from the user.

14. The system of claim 12, wherein the routing element is further configured to:
identify the number associated with the calling line; and
confirm the number as the new destination with the user.

15. The system of claim 12, wherein the routing element is further configured to substitute an override destination for the destination in the list of destinations.

16. The system of claim 15, wherein the first destination comprises the override destination.

17. The system of claim 15, wherein the routing element is further configured:
to determine whether the source of the communication is a priority caller, and
if the source is a priority caller, then to select the override destination as the destination.

18. The system of claim 17, wherein the routing element is further configured to then select a default destination for routing the communication if the source is not a priority caller.

19. The system of claim 9, wherein the routing element is further configured:
to check the communication routing information for a mobile telephone destination;
to check for a powered-on indication of the mobile telephone destination if the mobile telephone destination is present in the communication routing information; and
to select the mobile telephone destination as the first destination if the mobile telephone destination provides the powered-on indication.

20. The system of claim 9, wherein the communication directed to the number is received and routed by a network element according to the list of destinations.

* * * * *